United States Patent [19]

Faupell

[11] Patent Number: 4,571,800
[45] Date of Patent: Feb. 25, 1986

[54] METHOD FOR EXPLOSIVELY FORMING AN AUXILIARY EXIT CONE FOR THE NOZZLE OF A ROCKET MOTOR

[75] Inventor: Lawrence C. Faupell, North Logan, Utah

[73] Assignee: Thiokol Corporation, Chicago, Ill.

[21] Appl. No.: 512,274

[22] Filed: Jul. 11, 1983

[51] Int. Cl.[4] .............................................. B23P 13/00
[52] U.S. Cl. ................................ 29/157 C; 29/421 E; 60/271; 72/168; 72/379; 239/265.43
[58] Field of Search .................... 29/157 C, 421 E; 60/271; 72/54, 56, 60, 168, 379; 239/265.19, 265.33, 265.43

[56] References Cited

U.S. PATENT DOCUMENTS

| | | | |
|---|---|---|---|
| 2,693,637 | 11/1954 | Peabody et al. | 72/60 X |
| 3,065,720 | 11/1962 | Rardin | 29/241 E X |
| 3,120,827 | 2/1964 | Abegg et al. | 29/241 E X |
| 3,128,732 | 4/1964 | Paynter et al. | 29/241 E X |
| 3,177,689 | 4/1965 | Chistian et al. | 29/421 E X |
| 3,249,306 | 5/1966 | Altseimer | 239/265.43 X |
| 3,286,329 | 11/1966 | Naruse et al. | 72/56 X |
| 3,358,933 | 12/1967 | Altseimer | 239/265.43 |
| 4,184,238 | 1/1980 | Carey | 29/157 C |
| 4,272,956 | 6/1981 | Lamere et al. | 239/265.15 X |

Primary Examiner—Howard N. Goldberg
Assistant Examiner—Ronald S. Wallace
Attorney, Agent, or Firm—Gerald K. White

[57] ABSTRACT

A method of and apparatus for forming with a minimum of labor, by explosive forming means, an automatically extendible auxiliary nozzle member or exit cone for a rocket motor, the member having tapered sinusoidal flutes with the stresses and thicknesses thereof being uniform whereby, when deployed, the resulting form of cone can be predicted with accuracy, and stresses being created such as to build a spring bias therein so that the member is bistable, that is, stable in both the stowed position and in the deployed position.

7 Claims, 6 Drawing Figures

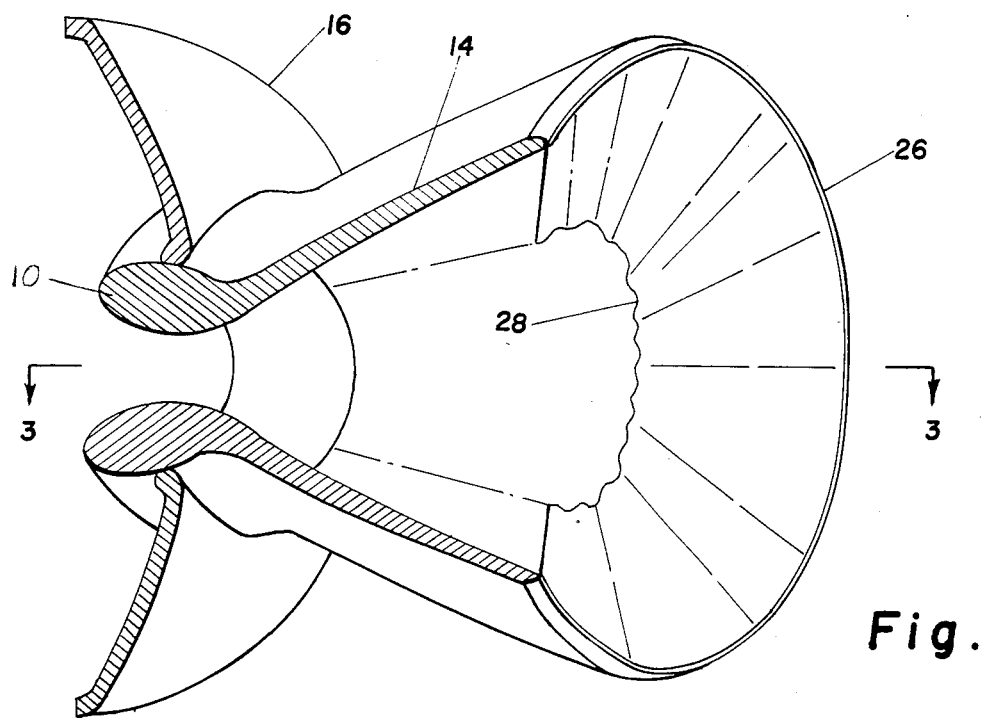
Fig. 1
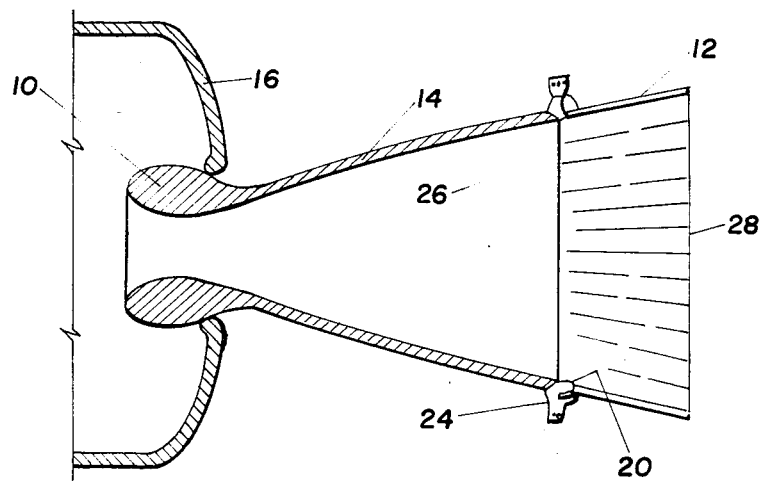
Fig. 2
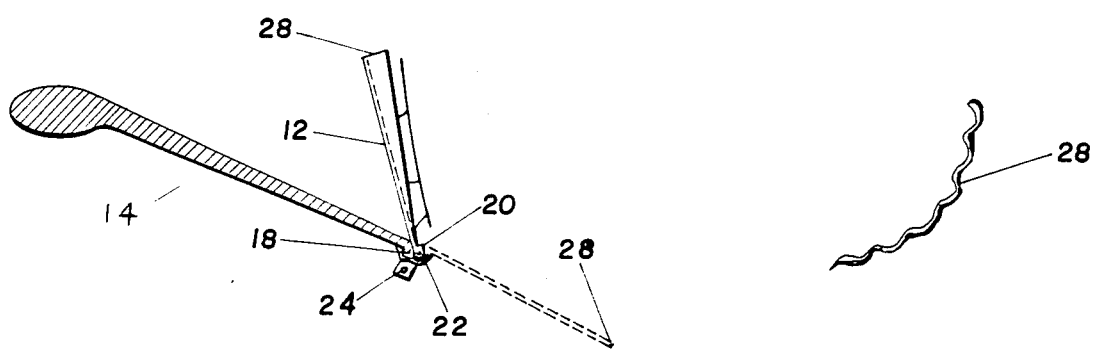
Fig. 3
Fig. 4

METHOD FOR EXPLOSIVELY FORMING AN AUXILIARY EXIT CONE FOR THE NOZZLE OF A ROCKET MOTOR

BACKGROUND OF THE INVENTION

1. Field of the Invention

This invention relates to an improvement in rocket nozzles, and more particularly, to an improved method for forming an automatically extendible auxiliary nozzle member or exit cone for a rocket motor.

2. Description of the Prior Art

Deep space ballistic missile systems or satellite probes require high performance, low weight, and highly packageable primary propulsion systems. Excluding propellant tanks, the largest component of a propulsion system is the rocket exhaust nozzle. The rocket nozzle takes up a great deal of valuable space relative to its mass.

Conventional thrust nozzle exit cones for rocket motor ballistic systems are designed to provide the best average performance over the whole intended trajectory within the volumetric constraints created by launch tube clearance and interstage length limitations. One of the functions of the exit cone of a rocket nozzle is to provide an inclined surface against which the expanding exhaust plume of the rocket can bear, thereby providing some of the forward thrust of the rocket. The exhaust plume grows larger with increasing altitude of the rocket because of the decreasing pressure of the ambient atmosphere. As a result, in a conventional rocket nozzle, the exhaust plume at low altitudes is too small for the available surface of the exit cone. This allows the formation, inside the edges of the exit cone, of a partial vacuum which creates an atmospheric drag on the rocket. At high altitudes the exhaust plume is too large for the exit cone, and as a result, much of the potential energy is unused. A rocket nozzle that is sufficiently large to make full use of the expanding exhaust gases of a rocket in the low ambient pressures at high altitudes would normally occupy an inordinately large proportion of the available storage space in silos, submarines, aircraft, or between stages of a multi-stage missile.

Various proposals have been made in the prior art to provide a large expansion ratio nozzle that can be stowed in a collapsed or retracted configuration and thus made to fit into a minimal storage space, and that can be extended to the operating position after motor ignition. These have included the use of:

(a) an inflatable auxiliary rocket nozzle member or skirt that is inflated and extended by turbine exhaust gases when the rocket starts, as disclosed in U.S. Pat. No. 3,596,465 to Thomas O. Paine et al;

(b) rocket nozzle members or exit cones that are highly flexible and can be compressed or expanded in various ways, as disclosed in said Paine et al patent, and in U.S. Pat. No. 3,346,186 to D. L. Fulton et al, in U.S. Pat. No. 3,358,933 to J. H. Altseimer, and in U.S. Pat. No. 4,272,956 to G. C. Lamere et al;

(c) rocket nozzle members or exit cones wherein a thin sheet metal nozzle extension is inter-rolled into convolute form whereby an intermediate larger diameter portion encircles a small diameter mounting end portion, as disclosed in U.S. Pat. No. 3,711,027 to L. F. Carey, and U.S. Pat. No. 3,784,109 to J. W. Dueringer; and (d) rocket nozzle members or exit cones that are segmented longitudinally as disclosed in a paper entitled "Nested Extendible Exit Cone Solid Rocket Nozzle Engineering Evaluation Program" presented at the AIAA/SAE 14th Joint Propulsion Conference, Las Vegas, Nev., July 25–27, 1978, and as disclosed in copending application for U.S. Patent bearing Ser. No. 230,939, filed on Feb. 12, 1981 by Frank S. Inman, and assigned to Thiokol Corporation, the assignee of the present invention.

The Fulton et al patent shows an externally folded cloth or mesh nozzle extension on a rocket with the nozzle extension being deployed by pressurized telescopic tubes that are actuated when a predetermined altitude has been reached.

In FIGS. 1–4 of the Altseimer patent a corrugated rocket nozzle skirt is provided that is expandable transversely of the rocket motor longitudinal axis, the skirt being said to be made of metallic or non-metallic material, but not being foldable. At high altitudes where the gas pressure within the nozzle exceeds the ambient pressure, outward pressure expands the skirt. The nozzle area ratio thus is increased automatically as the atmospheric pressure decreases.

In FIG. 5 of the Altseimer patent an inwardly folded flared skirt is provided. That skirt is described as being made of a material such as reinforced rubber produced under the trademark GEN-GARD by the General Tire and Rubber Company or asbestos reinforced with inconel wire and impregnated with an ablative such as TEFLON, a tradmark of E. I. duPont de Nemours and Co., Inc. Firing of the rocket motor ejects the inwardly folded skirt, the ambient pressure acting against the pressure of the exhaust thereafter determining the degree of opening of the skirt.

The Carey and Dueringer patents disclose related subject matter, the material of the foldable rocket nozzle extension of the Carey patent being described as thin sheet metal but that of the Dueringer patent not being mentioned. In each of the patents a temporary cover member is attached to the exit end portion of the nozzle and seals the nozzle against internal gas pressures. Thus, when the rocket is fired, the cover causes the nozzle structure to unroll and deploy into extended configuration. The cover member is jettisoned after the nozzle is deployed.

In the Lamere patent, a rocket motor nozzle extension member or skirt is provided that is made of thin high temperature resistant material. The skirt is inwardly folded back in a pleated manner, deployment being automatically by combustion gases. When opened, the pleats are described as providing enough material to afford a frusto-concial surface in line with the expansion cone of the nozzle. Deployment of the skirt is delayed by an erodable barrier.

In the longitudinally segmented rocket nozzle exit cones of the paper presented at the AIAA/SAE 14th Joint Propulsion Conference and in the application for patent of Frank S. Inman, the various nozzle segments are actuated by separate mechanical means.

While concerned with the problem of how to make the auxiliary nozzle member or exit cone of a rocket nozzle more compact so as to fit in a minimal storage space, such proposals of the prior art are overly complicated or are "labor intensive", and hence expensive to build. The practice, for example, in fabricating the Lamere et al simple pleated auxiliary nozzle portion or skirt is for a skilled workman to take a flat ductile sheet, and using a die, repetitively and laboriously forming each pleat one by one. Following the formation of the pleats, the ends of the sheet are welded together. This is not only an expensive method of forming the skirt, being labor intensive, but it is difficult to insure that the resulting stresses and thicknesses of the pleats are uniform. As a consequence, the resulting form of the cone cannot be predicted with accuracy.

It is of significance that none of the aforementioned proposals of the prior art have disclosed, or otherwise taught or considered, how to make the rocket nozzle cone extendible or retractable, and at the same time, shown how to form the auxiliary nozzle member or skirt so as to insure that the stresses produced therein, and the thicknesses thereof are uniform to the end that when automatically deployed by the exhaust gases of the rocket, a more regular cone in line with the expansion cone of the nozzle is formed, and additionally, the form of the cone that results is one that can be predicted with accuracy.

Thus, there is a need and a demand for further improvements in automatically extendible auxiliary nozzle members or exit cones for rocket motors.

SUMMARY OF THE INVENTION

An object of the invention is to provide an improved method of and apparatus for forming an automatically extendible auxiliary nozzle member or exit cone for a rocket motor.

Another object of the invention is to provide such an improved method that involves a minimum of labor in the forming of each auxiliary nozzle member or exit cone, and additionally, is adapted for the mass production thereof.

A further object of the invention is to provide an improved extendible auxiliary nozzle member or exit cone for a rocket motor.

Still another object of the invention is to provide such an improved auxiliary nozzle member or exit cone having tapered sinusoidal flutes formed therein and characterized in being uniformly thick and uniformly stressed whereby a spring bias is built up therein such that it is bistable, that is, stable in both the stowed and deployed positions, and when deployed, forms a more regular cone.

In accomplishing these and other objectives, the invention contemplates explosive forming of an auxiliary nozzle extension member or exit cone that is adapted to be automatically actuated by the exhaust gases of a rocket motor for extending a conventional, convergent-divergent thrust nozzle. Thus, the nozzle is provided with a short, curved, outwardly extending flange that forms a seat for a bead on the forward end of the extension member. The joint between the exit cone of the nozzle and the extension member is completed by an annular clamp that may be fastened by screws and fits over the flange and the bead of the nozzle.

When in stowed position, the end of the extension member that is attached to the exit cone of the nozzle is circular. The other end of the extension member is sinusoidal in configuration, thus forming a plurality of side-by-side longitudinal flutes that taper to the circular, attached end.

In stowed position, the free end of the extension member is folded inwardly of the exit cone of the nozzle about the bead at the circular end thereof and is upstream of the circular end. When impinged upon by the exhaust gases of the rocket, the extension member is rotated about the bead at the circular end so that, effectively, it is turned inside out. In this process, the sinusoidal configuration of the extension member is stretched out so that the extension member becomes a hollow truncated cone.

In accordance with the invention the extension member is formed in the described tapered sinusoidal configuration by explosive forming. This method of forming the extension member involves a minimum of labor, results in a more uniform product, and additionally, creates stresses that build a spring bias into the material of the member so that it is stable in both the stowed and deployed positions thereof, and moreover, when deployed, forms a more regular cone.

Having summarized the invention, a detailed description follows with reference being made to the accompanying drawings which form part of the specification, of which:

FIG. 1 is a partially cutaway perspective view of the auxiliary nozzle member or skirt in stowed position in a rocket motor nozzle before operation of the motor;

FIG. 2 is a cross sectional view of the rocket motor nozzle showing the skirt in fully deployed position;

FIG. 3 is a cross sectional view of the rocket motor nozzle taken along the lines 3—3 of FIG. 1 showing the skirt in stowed position in solid outline and in deployed position in dotted outline;

FIG. 4 is a fragmented view illustrating the sinusoidal configuration of the free end of the skirt in the stowed position;

DESCRIPTION OF THE PREFERRED EMBODIMENT

Figure 5:
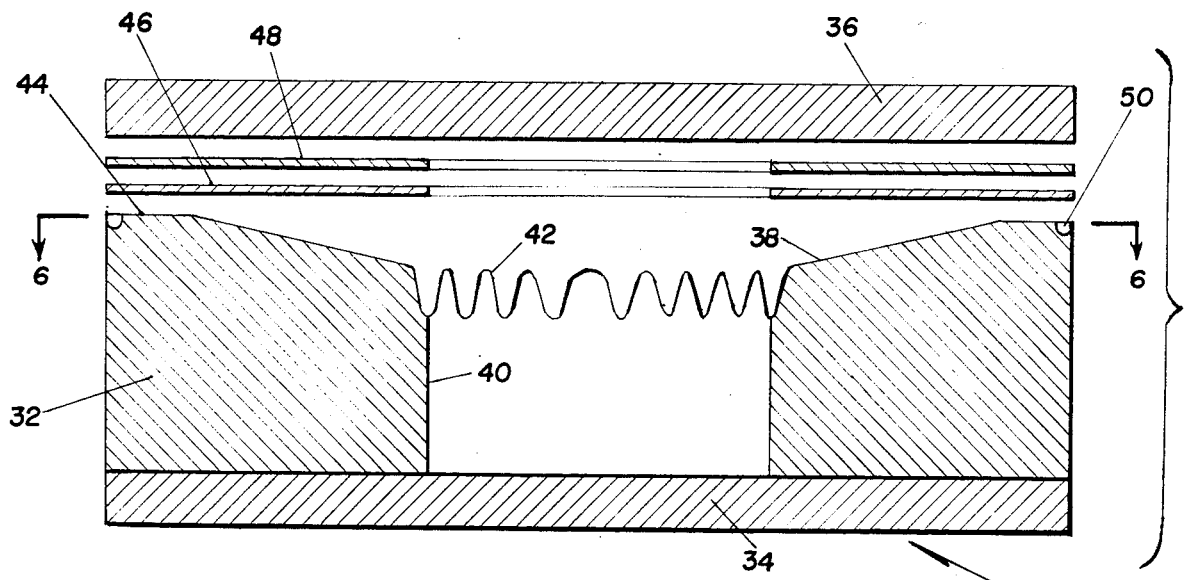
FIG. 5 is an exploded view of a molding apparatus or die assembly for explosively forming the skirt.

There is illustrated in FIGS. 1 and 2 a rocket motor nozzle 10 having a deployable extension member of skirt 12 that is hinged at the outer periphery of the exit cone 14. The skirt 12 is capable of being folded inwardly of the nozzle exit cone 14 into a stowed position and of being folded outwardly, that is, effectively turned inside out, into a deployed position. The skirt 12 is characterized in being bistable, that is, stable in both the stowed and the deployed positions. Deployment of skirt 12 is effected by the combustion gases emanating from the rocket motor 16 upon firing of the latter.

In a preferred embodiment of the invention, skirt 12 is constructed of thin high temperature resistant metal or other suitable material. As best seen in FIG. 3, the nozzle 10 has a short, curved, and outwardly extending flange 18 at the outer edge of the exit cone 14 that forms a seat for a bead 20 on the end of skirt 12 that is hinged to the exit cone 14. The joint or hinge between the exit cone 14 of nozzle 10 and the skirt is completed by an annular, channel-type clamp 22. Clamp 22 is fastened by screws 24 that fit over the flange 18 and bead 20.

When in stowed position, as shown in FIG. 1 and in solid lines in FIG. 3, the end 26 of the skirt 12 which is attached to the exit cone 14 is circular while the other or free end 28 of the skirt 12 is sinusoidal in configuration, as illustrated in FIG. 4. This forms a plurality of side-by-side flutes that taper to the attached end 26. The skirt 12 can be formed in this manner by explosive forming, a technique that per se is known in the prior art. An explanation of a preferred way of using the explosive forming technique in the forming of skirt 12 is described herein with reference to FIGS. 5 and 6.

As seen in FIGS. 1 and 3, in stowed position, the free end 28 of the skirt 12 is upstream of the hinged end 26 that is attached to the exit cone 14. When impinged upon by the exhaust gases of the rocket motor 16, however, the skirt 12 is rotated about the bead 20 so that, effectively, it is turned inside out. In this process, the sinusoidal configuration of the skirt is stretched out so that the skirt 12 becomes a hollow, truncated cone.

A feature of the present invention is the explosive forming of the skirt 12 with sinusoidal tapered flutes. Forming the sinusoidal side-by-side flutes in this manner not only avoids the labor and consequent expense of shaping by hand the tapered sinusoidal flutes one-by-one, but avoids the need, also, for separately welding the abutting ends of the sheet of material from which the skirt is formed to form an integral skirt. Additionally, explosive forming assures that the resulting stresses and thicknesses of the skirt configuration are uniform. This results in a more uniform skirt and creates stresses therein that build a spring bias into the material from which the skirt is formed so that the skirt is bistable, and when deployed, forms a more regular cone.

Figure 6:
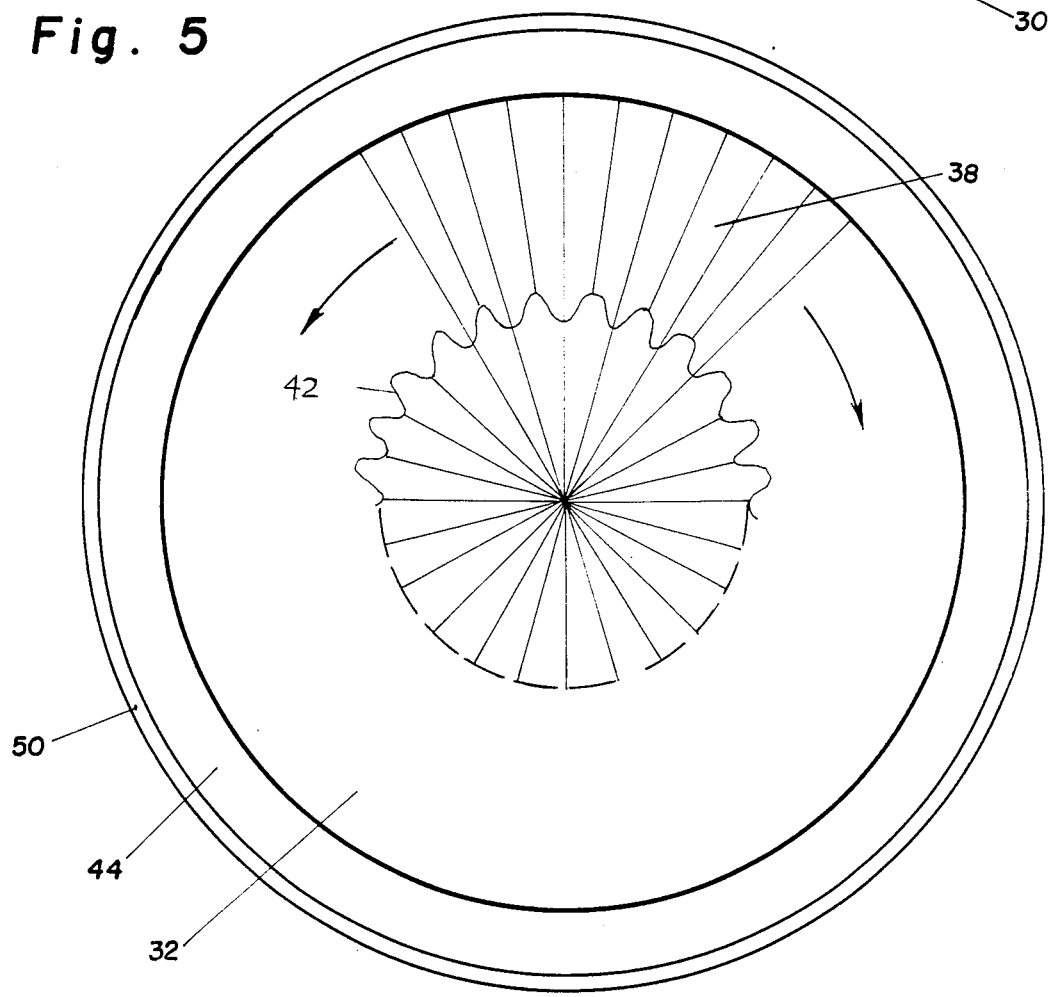
FIG. 6 is a cross-sectional view taken along the lines 6—6 of FIG. 5.

A form of apparatus that may be used in the explosive forming of the skirt 12 is illustrated in FIGS. 5 and 6. That apparatus, generally designated by the reference numeral 30, comprises a three-part mold or die assembly including a die 32, a lower die closure plate 34, and an upper die backing plate 36.

The die 32 is cylindrical and has the general form of a toroid with an upper inner frusto conical surface 38 sloping downwardly inwardly from a first end to a central cylindrical opening or hole 40 at a second end. Formed completely around the frusto conical surface 38 are a plurality of identical sinusoidal tapered flutes 42. The amplitudes of the sinusoidal variations of the flutes 42 vary linearly from a maximum at the hole 40 to zero at the upper peripheral area 44 at the first end of the die 32.

A work piece 46 from which skirt 12 is to be formed, and a solid explosive sheet 48 are positioned, as shown in FIG. 5 and are held between the first end of the die 32 and the backing plate 36, the peripheral areas of the die 32, backing plate 36 and sheets 46 and 48 being in overlapping relationship. Work piece 46 and explosive sheet 48 each are circular and have the form of a flat disc with a circular opening or hole formed in the middle and are coaxially positioned on the first end of die 32. Work piece 46 may be formed from a sheet of thin high temperature resistant material. Explosive sheet 48 may comprise a relatively slow burning explosive, that is, slow burning compared to cutting type devices, but not slow burning compared to common brissant explosives. One form of explosive that may be employed for explosive 48 is that sold under the trademark DETA SHEET by E. I. duPont de Nemours & Company. Suitable electrical connections (not shown) may be provided through the wall of backing plate 36 in association with suitable means (not shown) for activating the explosive 48. The explosive 48 forms a very inexpensive source of power.

Backing plate 36 may be fixedly attached in any suitable manner to the die 32, for example, by bolting or clamping. Cover plate 34 may be fixedly attached to die 32 in a similar manner, or if desired, may be permanently attached to the die 32 in any suitable manner. Cover plate 34 and backing plate 36 may be made of steel and other suitable materials.

The die 32 may be made from cement, plastics, fiber glass, etc. Adjacent the periphery of the upper surface 44, a circular groove 50 is provided for facilitating the formation of the bead 20 on skirt 12.

After the work piece 46 and explosive sheet 48 have been placed in position between the die 32 and the backing plate 36 and the backing plate 36 and cover plate 34 have been clamped in sealing relationship to the die 32, the explosive sheet 48 is activated. The resulting explosive action causes the explosive sheet 48 to change suddenly to a quickly expanding gas, the pressure shock of which rapidly expands the work piece 46 into engagement with the sinusoidal tapered flutes 42. Thus, in a single rapidly occuring operation, there is formed in the work piece 46 the plurality of side-by-side sinusoidal tapered flutes and also the bead 20 characterizing the skirt 12, with a first end, the larger diameter, circular, and a second end, the smaller diameter, sinusoidal in configuration, the flutes tapering from the second end to the first end.

Thus, in accordance with the invention, there has been provided an improved method of forming an automatically extendible nozzle member or skirt for a rocket motor. The improved method is characterized in providing a skirt that is uniformly thick and stressed, whereby a spring bias is built up therein such that the skirt is bistable, being stable in both the stowed and the deployed positions thereof, and as a consequence, forms a more regular cone in the deployed position thereof. The improved method is further characterized in being particularly adapted for the mass production of automatically extendible nozzles or skirts for rocket motors involving a minimum of labor and time, also, in the formation of each skirt, effecting a reduction in the cost of manufacture as well as facilitating the manufacture of more uniform skirts that when deployed form more regular cones, the resulting form of the cone being one that can be predicted with accuracy.

What is claimed is:

1. The method of forming an auxiliary exit cone for the nozzle of a rocket motor comprising the steps of
    positioning and sealing a flat circular sheet of thin high temperature resistant material having a coaxial circular opening therein in operative association with the forming surface of a die with the circular sheet of material gripped fixedly at the peripheral edge thereof to a peripheral edge of the die, the forming surface of the die being within the boundary of the outer edge thereof and having the shape of a frustum of a cone with longitudinally directed sinusoidal tapered flutes formed therein and positioned adjacent a substantial portion of the area of said circular sheet of material, and
    explosively producing a pressure shock to cause said substantial portion of said circular sheet of material to engage and conform to the shape of the forming surface of the die.

2. The method as specified in claim 1 wherein the flutes formed in the forming surface of the die taper linearly from a maximum amplitude of sinusoidal variation at the smaller diameter of the frustum of a cone to zero at the larger diameter thereof.

3. The method as specified in claim 2 further including the step of forming a circular groove in the said peripheral edge of the die whereby the pressure shock causes the peripheral edge of the circular sheet of material to engage and conform to the shape of said circular groove thereby to form a peripheral bead on said sheet of material.

4. The method as specified in claim 1 further including the steps of
forming the flat circular sheet of thin high temperature resistant material having a coaxial circular opening therein,
forming a flat circular sheet of solid explosive having a coaxial circular opening therein with the configuration of said circular sheet of explosive substantially matching that of said circular sheet of material,
positioning said circular sheet of material between said circular sheet of explosive and the die,
positioning a backing plate against said circular sheet of explosive and fixedly attaching said backing plate to the die with the peripheral edges of said circular sheets of explosive and material in sealing relationship with the said peripheral edge of the die, and
activating said circular sheet of explosive to produce said pressure shock.

5. The method as specified in claim 4 further including the steps of
forming the die with a first end and a second end with an internal opening between said first end and said second end, with the side wall surface of the portion of said opening adjacent said first end comprising the frustum of a cone having a longitudinal axis coincident with the axis of said opening and narrowing internally from said first end of said die to said second end thereof, and with the side wall surface of the portion of said opening adjacent said second end of the die comprising a cylinder having a diameter that is substantially the same as the smaller diameter of the frustum of a cone, and
fixedly attaching a closure plate in sealing relationship with said second end of the die.

6. The method as specified in claim 5 further including the steps of
forming the surface of the die to taper linearly from a maximum amplitude of sinusoidal variation at the smaller diameter of the frustum of a cone to zero at the larger diameter thereof.

7. The method as specified in claim 6 further including the step of forming a circular groove in the first end of the die adjacent the peripheral edge thereof whereby the pressure shock produced upon activation of said circular sheet of explosive causes the peripheral edge of the circular sheet of material to engage and conform to the shape of said circular groove thereby to form a peripheral bead on said sheet of material.

* * * * *